(12) United States Patent
Novelle et al.

(10) Patent No.: US 11,718,516 B2
(45) Date of Patent: Aug. 8, 2023

(54) BEVERAGE DISPENSING HEADS WITH LIGHTING MODULES

(71) Applicant: Marmon Foodservice Technologies, Inc., Osseo, MN (US)

(72) Inventors: Anthony Novelle, Glen Ellyn, IL (US); Steven Miller, South Elgin, IL (US); Kurt Zoellick, Oak Park, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 0 days.

(21) Appl. No.: 17/527,727

(22) Filed: Nov. 16, 2021

(65) Prior Publication Data

US 2022/0073334 A1 Mar. 10, 2022

Related U.S. Application Data (60) Division of application No. 16/197,507, filed on Nov. 21, 2018, now Pat. No. 11,203,517, which is a
(Continued)

(51) Int. Cl.
*B67D 1/08* (2006.01)
*G09F 13/04* (2006.01)
(Continued)

(52) U.S. Cl.
CPC ......... *B67D 1/0875* (2013.01); *B67D 1/0021* (2013.01); *B67D 1/0044* (2013.01);
(Continued)

(58) Field of Classification Search
CPC .. B67D 1/0875; B67D 1/0021; B67D 1/0044; B67D 1/0085; B67D 1/0872;
(Continued)

(56) References Cited

U.S. PATENT DOCUMENTS 2,528,898 A 11/1950 Mcilvaine
3,752,192 A 8/1973 Kleppin
(Continued)

FOREIGN PATENT DOCUMENTS

CN 101242801 8/2008
GB 2353625 2/2001
(Continued)

OTHER PUBLICATIONS

International Search Report and Written Opinion, PCT/US2017/029051, dated Jul. 6, 2017.
(Continued)

*Primary Examiner* — Zheng Song
(74) *Attorney, Agent, or Firm* — Andrus Intellectual Property Law, LLP (57) ABSTRACT

A beverage dispensing head includes a housing having a front, a rear, and a base that extends between the front and the rear. A mixing nozzle is configured to dispense a flow of beverage via the base. A valve is configured to control the flow of beverage via the mixing nozzle, and a switch is movable into and between a closed position in which the valve opens the flow of beverage via the mixing nozzle and an open position in which the valve closes the flow of beverage via the mixing nozzle. A lighting module disposed in the housing is configured to illuminate the front of the housing and the base of the housing when the switch is moved into the closed position.

18 Claims, 11 Drawing Sheets

Related U.S. Application Data continuation of application No. PCT/US2017/029051, filed on Apr. 24, 2017, which is a continuation of application No. 15/403,686, filed on Jan. 11, 2017, now Pat. No. 10,077,180.

(60) Provisional application No. 62/344,606, filed on Jun. 2, 2016.

(51) Int. Cl.
  *B67D 1/00* (2006.01)
  *B67D 1/16* (2006.01)
  *F21V 23/04* (2006.01)
  *F21V 33/00* (2006.01)
  *F21V 8/00* (2006.01)

(52) U.S. Cl.
  CPC .......... *B67D 1/0085* (2013.01); *B67D 1/0872* (2013.01); *B67D 1/0888* (2013.01); *B67D 1/16* (2013.01); *F21V 23/04* (2013.01); *F21V 33/00* (2013.01); *G02B 6/0033* (2013.01); *G09F 13/0422* (2021.05); *B67D 2001/0089* (2013.01); *G02B 6/0021* (2013.01); *G02B 6/0051* (2013.01); *G02B 6/0055* (2013.01)

(58) Field of Classification Search
  CPC .............. B67D 1/0888; B67D 1/16; B67D 2001/0089; F21V 33/00; F21V 23/04; G02B 6/0033; G02B 6/0021; G02B 6/0051; G09F 13/0422
  See application file for complete search history.

(56) References Cited

U.S. PATENT DOCUMENTS

| | | | |
|---|---|---|---|
| 4,426,021 A | 1/1984 | Rosenthal | |
| 4,883,100 A * | 11/1989 | Stembridge | G01F 23/296 367/90 |
| 4,894,647 A | 1/1990 | Walden, Jr. et al. | |
| 4,901,922 A | 2/1990 | Kessener et al. | |
| RE33,435 E * | 11/1990 | Koblasz | G01F 23/2962 367/908 |
| 5,129,548 A | 7/1992 | Wisniewski | |
| 5,165,580 A | 11/1992 | Rosenthal | |
| 5,193,718 A * | 3/1993 | Hassell | B67D 1/0888 439/911 |
| 5,291,378 A | 3/1994 | Stone | |
| 5,451,773 A | 9/1995 | Triner et al. | |
| 5,454,406 A | 10/1995 | Rejret | |
| 5,463,877 A | 11/1995 | Young | |
| 5,491,617 A * | 2/1996 | Currie | G02B 6/0005 222/113 |
| 5,862,844 A * | 1/1999 | Perrin | B67D 1/124 141/351 |
| 6,023,869 A * | 2/2000 | Durbin | G09F 13/22 40/544 |
| 6,100,518 A | 8/2000 | Miller | |
| 6,354,342 B1 | 3/2002 | Gagliano | |
| 6,648,185 B1 | 11/2003 | Henry et al. | |
| 6,688,134 B2 | 2/2004 | Barton | |
| 6,705,489 B2 | 3/2004 | Henry et al. | |
| 7,753,231 B2 | 7/2010 | Giles et al. | |
| 7,931,382 B2 | 4/2011 | Hecht | |
| 8,109,301 B1 | 2/2012 | Denise | |
| 8,459,819 B2 | 6/2013 | Martindale et al. | |
| 8,770,094 B2 | 7/2014 | Rithener et al. | |
| 8,770,446 B2 | 7/2014 | Sevcik et al. | |
| 9,409,756 B2 | 8/2016 | Piatnik et al. | |
| 9,625,205 B2 * | 4/2017 | Becke | F25D 23/126 |
| 9,656,849 B2 | 5/2017 | Hawken | |
| 10,077,180 B2 | 9/2018 | Novelle et al. | |
| 2003/0089423 A1 | 5/2003 | Barton et al. | |
| 2004/0245287 A1 | 12/2004 | Fox | |
| 2005/0044871 A1 | 3/2005 | Nowak | |
| 2005/0047143 A1 | 3/2005 | Currie | |
| 2005/0074173 A1 | 4/2005 | Lee et al. | |
| 2005/0094398 A1 | 5/2005 | Currie | |
| 2006/0097009 A1 | 5/2006 | Bethuy et al. | |
| 2008/0232090 A1 | 9/2008 | Hecht | |
| 2010/0024890 A1 | 2/2010 | Romanyszyn et al. | |
| 2010/0299981 A1 * | 12/2010 | Baron | G09F 13/04 40/541 |
| 2011/0174008 A1 * | 7/2011 | Kim | F25D 23/126 62/264 |
| 2012/0300441 A1 | 11/2012 | Thomas et al. | |
| 2014/0361041 A1 | 12/2014 | Hawken | |
| 2016/0138790 A1 * | 5/2016 | Peterson | G02B 6/0063 362/23.19 |
| 2016/0207753 A1 | 7/2016 | Choi et al. | |
| 2016/0340166 A1 | 11/2016 | Broen et al. | |
| 2016/0372015 A1 | 12/2016 | Reust et al. | |
| 2017/0086477 A1 | 3/2017 | Grampassi | |
| 2017/0349424 A1 | 12/2017 | Novelle et al. | |
| 2019/0120478 A1 * | 4/2019 | Lux | F25D 27/00 |

FOREIGN PATENT DOCUMENTS

| | | |
|---|---|---|
| WO | 2001/010906 | 3/2000 |
| WO | 2002-088610 | 11/2002 |

OTHER PUBLICATIONS

Chinese Office Action for CN 201780033467.8, dated Mar. 17, 2020.

* cited by examiner

_BEVERAGE DISPENSING HEADS WITH LIGHTING MODULES_

CROSS-REFERENCE TO RELATED APPLICATION

The present application is a divisional of U.S. patent application Ser. No. 16/197,507, filed Nov. 21, 2018, which is a continuation application claiming priority from International Patent Application No. PCT/US2017/029051, filed Apr. 24, 2017. The '051 application is based on and claims priority to U.S. patent application Ser. No. 15/403,686, filed Jan. 11, 2017 and U.S. Provisional Patent Application Ser. No. 62/344,606 filed Jun. 2, 2016, the disclosure of which is incorporated herein by reference.

FIELD

The present disclosure relates to beverage dispensing heads, particularly beverage dispensing heads having lighting modules that illuminate portions of the beverage dispensing head.

BACKGROUND

The following U.S. Patents and U.S. Patent Application are incorporated herein by reference in entirety.

U.S. Pat. No. 6,648,185 discloses an electrically operated pre-mix valve including a cup lever operable to activate a switch to energize a solenoid. The solenoid operates a first lever, which then contacts and operates a second lever. The second lever, in turn, moves against the contact end of an actuating shaft. The actuating shaft is thereby moved to permit beverage flow through the valve and out of a nozzle thereof. The valve uses a compound lever system to gain a mechanical advantage for substantially lessening the opening force required to be applied by the solenoid.

U.S. Pat. No. 8,770,446 discloses a system and method for dispensing a predetermined portion of a beverage or drink additive using a cost effective portion control valve that replaces electrical components with mechanical components.

U.S. Pat. No. 9,656,849 discloses a valve dispensing system that can be used in a beverage dispenser. In particular, the valve dispensing system has individual valve module components that control the flow of a beverage or beverage component, and a plurality of valve module components may be combined to form a system capable of dispensing a plurality of beverages and/or beverage components.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a beverage dispensing head includes a housing having a front, a rear, and a base that extends between the front and the rear. A mixing nozzle is configured to dispense a flow of beverage via the base. A valve is configured to control the flow of beverage via the mixing nozzle. A switch is movable into and between a closed position in which the valve opens the flow of beverage via the mixing nozzle and an open position in which the valve closes the flow of beverage via the mixing nozzle. A lighting module disposed in the housing is configured to illuminate the front of the housing and the base of the housing when the switch is moved into the closed position.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

Through research and experimentation, the present inventors have recognized that beverage dispensing machines with discrete post-mix beverage dispensing heads (which dispense a single type of beverage from a single nozzle) do not include apparatuses for illuminating the housing of the beverage dispensing heads, the dispensing beverage, and/or working areas (e.g. drip tray) of the dispensing machines. The present inventors have also recognized that the lights that illuminate working areas of beverage dispensing machines having multi-flavor post-mix beverage dispensing heads (which dispense different flavors of beverages from a single nozzle) are not easily integrated into beverage dispensing machines with discrete post-mix beverage dispensing heads. Through research and experimentation, the present inventors have developed the presently disclosed lighting modules, which can be coupled to the discrete post-mix beverage dispensing heads. The present inventors have developed lighting modules that are self-contained and can be connected to the existing electrical circuit that provides power to the discrete post-mix beverage dispensing head.

Prior art post-mixed beverage dispensing heads commonly used in the industry receive two independent fluids (e.g. a flavor syrup and carbonated water) and dispense a beverage formed from the two fluids. Reference is made to the above-incorporated U.S. Patent Application and U.S. Patents for further description of the components and operation of the prior art post-mixed beverage dispensing heads.

Figure 1:
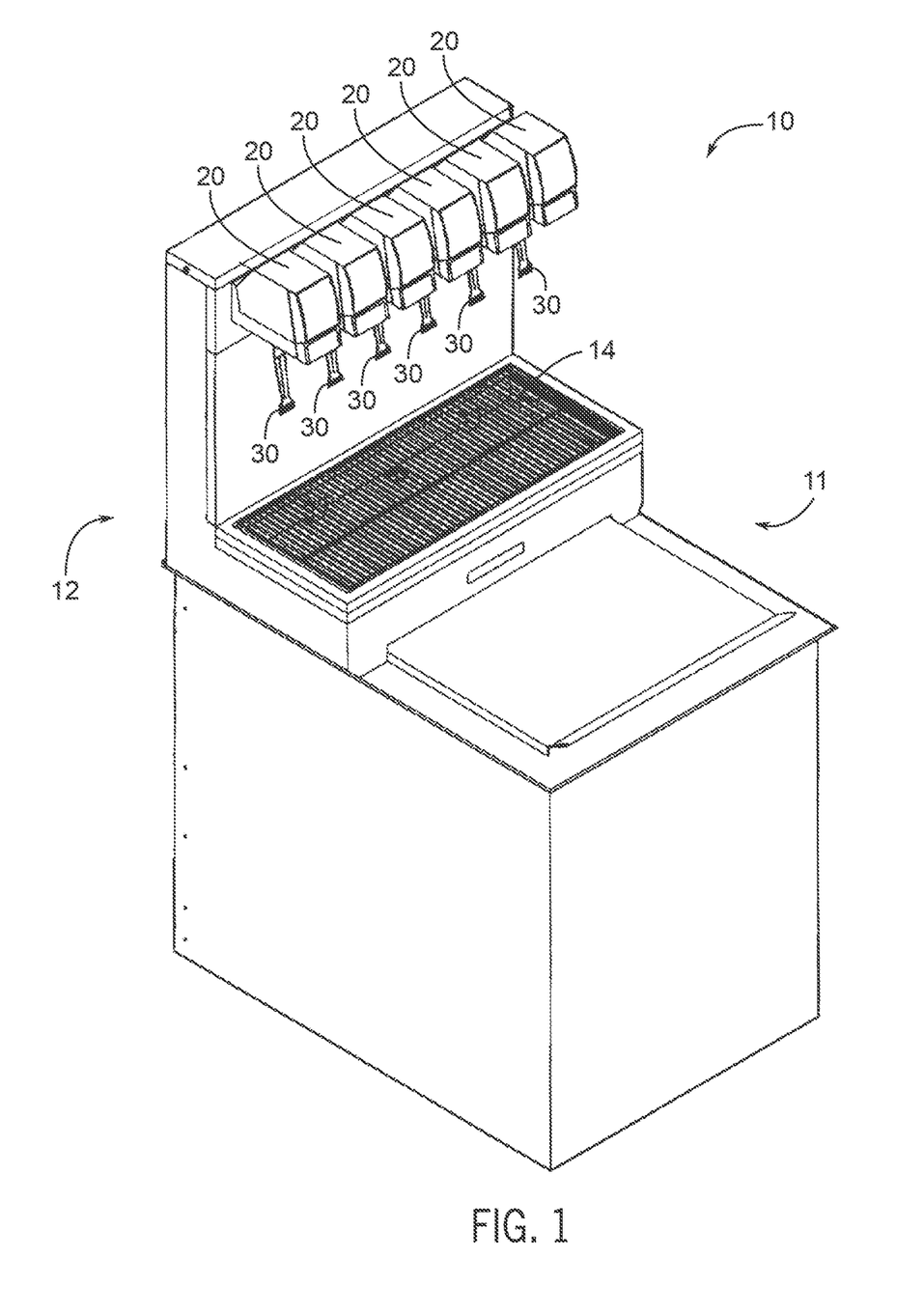
FIG. 1 is an example beverage dispensing machine.

Referring to FIG. 1, a beverage dispensing machine 10 has a plurality of post-mix beverage dispensing heads 20 for dispensing beverages to an operator. The beverage dispensing machine 10 includes a drip tray 14 for collecting any beverage that may spill during operation. The beverage dispensing machine 10 has a front side 11 for filing beverage receptacles (e.g. cups) with the beverage from the dispensing heads 20 and a rear side 12 opposite the front side 11 (which may be orientated toward a consumer). It will be recognized that each of the plurality of dispensing heads 20 in a beverage dispensing machine 10 can include any of the components and features described herein.

Figure 2:
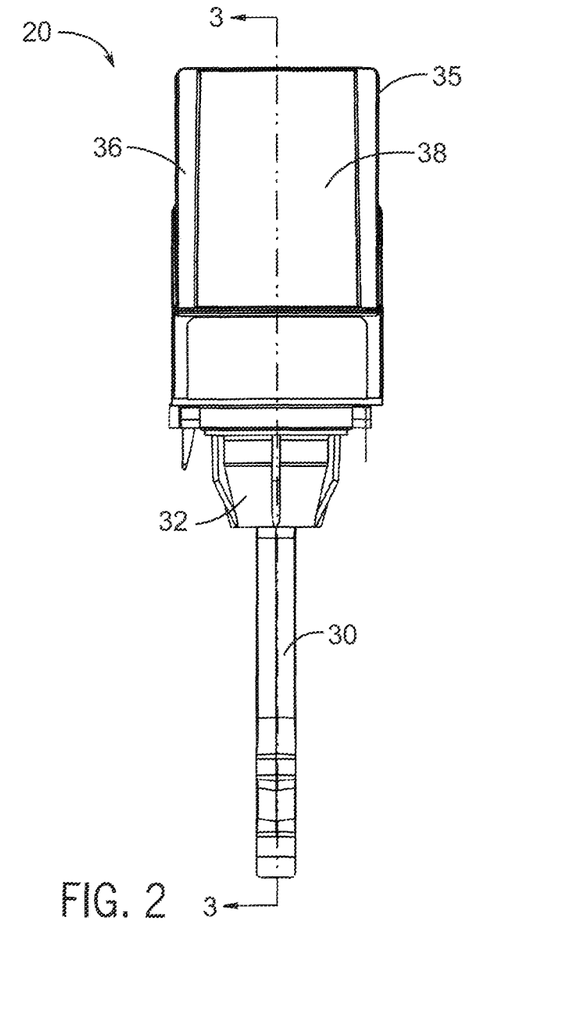
FIG. 2 is a front view of an example dispensing head.
Figure 3:
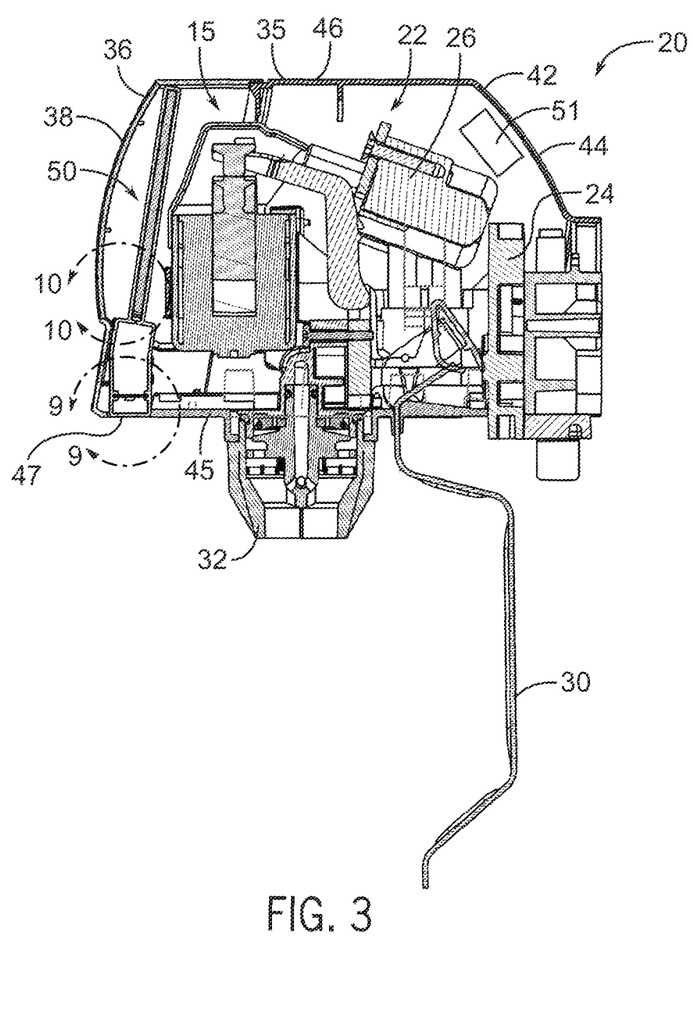
FIG. 3 is a cross section view of the dispensing head of FIG. 2 along line 3-3 in FIG. 2.
Figure 4:
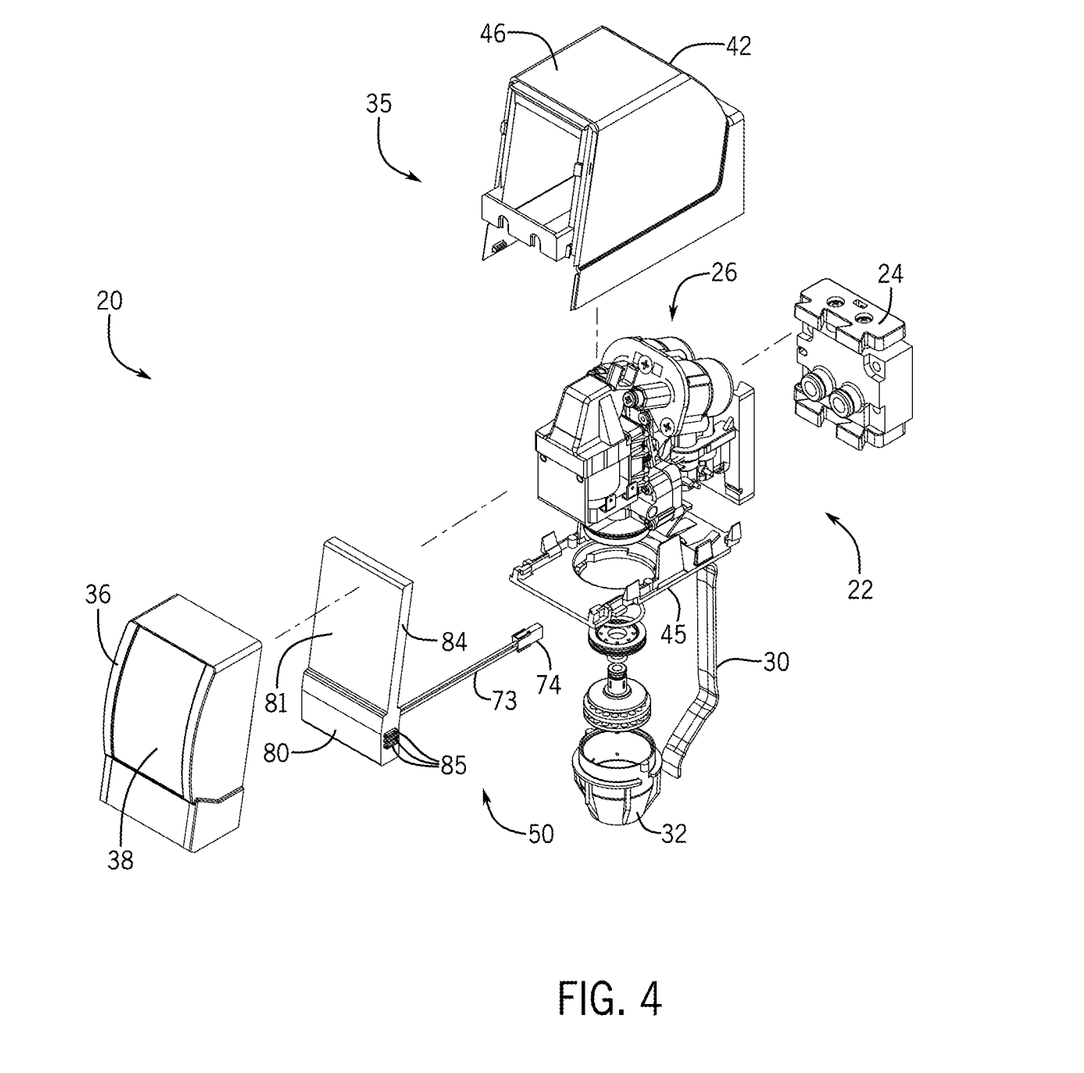
FIG. 4 is an exploded view of the dispensing head of FIG. 2.

Referring to FIGS. 2-4, each dispensing head 20 includes a housing 35 that covers and protects a valve assembly 22 (described further herein). The housing 35 includes a front 36, a rear 42 opposite the front 36, a base 45 that extends between the front 36 and the rear 42, and a top 46 opposite the base 45 that extends between the front 36 and the rear 42. The housing 35 defines a cavity 15 in which the valve assembly 22 and a lighting module 50 (described further herein) are disposed.

Figure 5:
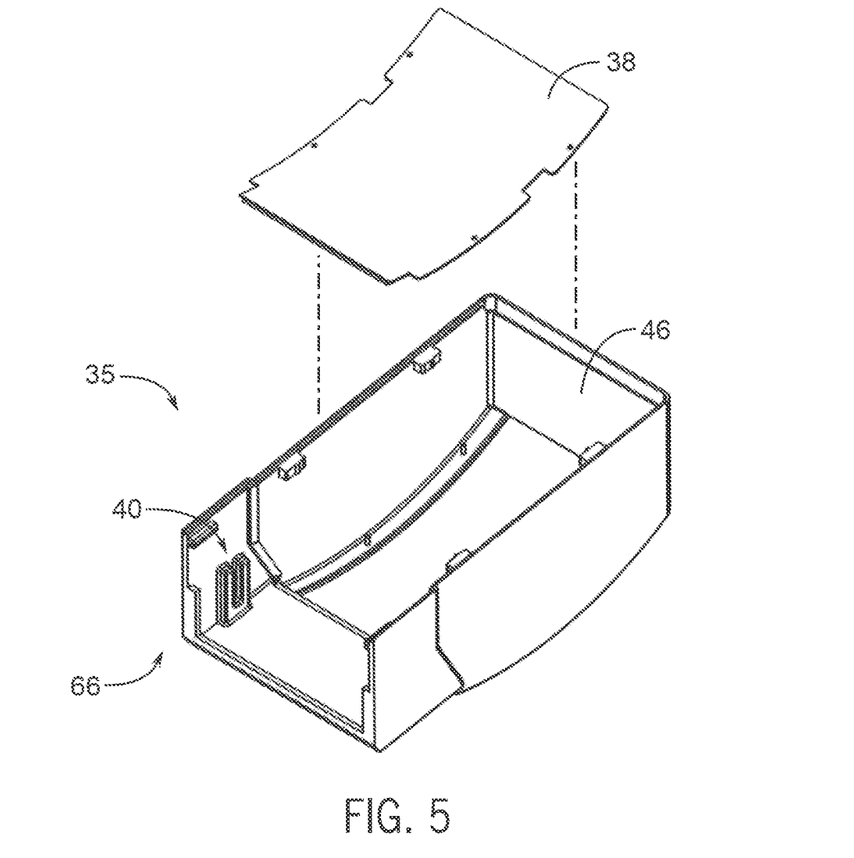
FIG. 5 is an exploded view of a front of a housing.

The front 36 is removably coupled to the dispensing head 20 and includes a display window 38 that can be either transparent or translucent. The display window 38 is removably coupled to the front 36 (FIG. 5). The display window 38 can be made of any suitable transparent or translucent material including glass, plastic, and/or the like. The display window 38 is configured to receive a graphic (e.g. an adhesive sticker) that displays indicia that corresponds to the beverage dispensed from the dispensing head 20 (e.g. an adhesive sticker having a beverage brand or flavor name (e.g. "Cherry Cola", "Diet Cola") is received on the display window 38). In certain examples, the display window 38 is curved so as to form a lens for focusing light from the lighting module 50. The front 36 is removably coupled to the dispensing head 20 such that the removal of the front 36 exposes the internal components of the dispensing head 20 (FIG. 4).

The rear 42 includes a rear display window 44 (FIG. 3) that can be either transparent or translucent. The rear display window 44 is removably coupled to the rear 42. The rear display window 44 is configured to receive a graphic, such as an adhesive sticker. The rear display window 44 can be made of any suitable transparent or translucent material including glass, plastic, and/or the like.

The base 45 includes a lighting opening 47 (FIG. 3) that is separate from the display window 38. A mixing nozzle 32 is removably coupled to the base 45 and is configured to dispense a beverage to the operator via the base 45 to the beverage receptacle.

Each dispensing head 20 further includes a valve assembly 22 (FIGS. 3-4) having a valve back block 24, a valve 26 configured to control flow of beverage through the mixing nozzle 32, and a switch 28 (FIG. 13) that is movable into and between a closed position in which the valve 26 opens the flow of beverage via the mixing nozzle 32 and an open position in which the valve 26 closes the flow of beverage via the mixing nozzle 32. The valve 26 can include any number of valves such as solenoid valves, check valves, and/or the like. Reference is made to the above incorporated U.S. Patents and U.S. Patent Application for further examples of valves for dispensing a beverage from the dispensing head 20.

Each dispensing head 20 further includes a lever 30 that extends from the base 45 of the housing 35 and is coupled to the switch 28 such that movement of the lever 30 causes the switch 28 to move to the closed position the valve 26 opens the flow of beverage via the mixing nozzle 32 and the lighting module 50 illuminates. That is, the lever 30 is configured to activate flow of beverage via the mixing nozzle 32 by moving the switch 28 to a closed position. In one example operation, a beverage receptacle is pressed against the lever 30 such that the lever 30 causes the switch 28 to move to the closed position. Reference is made to the above incorporated U.S. Patents and U.S. Patent Application for further details regarding examples of a dispense of beverage from the dispensing head 20.

Referring to FIGS. 7-11, the dispensing head 20 includes a lighting module 50 disposed in the cavity 15 (FIG. 8) defined by the housing 35. The lighting module 50 is configured to illuminate the front 36 of the housing 35 and the base 45 of the housing 35 when the switch 28 (FIG. 13) is moved into the closed position. That is, the lighting module 50 is configured to illuminate the display window 38 and/or the lighting opening 47 when the switch 28 is moved into the closed position. Illumination of the display window 38 can cause the graphic received on the display window 38 to illuminate and thereby display indicia to the operator. The lighting opening 47 is oriented toward the point of dispense of the beverage, i.e. the mixing nozzle 32, the flow of beverage into the beverage receptacle, and/or the drip tray. The illumination of the display window 38 and the lighting opening 47 can be simultaneous or sequential.

The lighting module 50 includes a first light source 61 orientated toward the display window 38 that emits light and a second light source 71 orientated toward the lighting opening 47 that emits light. The light sources 61, 71 include at least one light emitting diode (LED), and the light sources 61, 71 can include a printed circuit board.

The lighting module 50 further includes a light guide 52 that vertically upwardly guides light from the first lighting source 61 alongside the display window 38. In certain examples, the light guide 52 extends alongside a majority of the display window 38. The light guide 52 includes a front surface 53 for dispersing the light toward the display window 38 and a rear surface 54 opposite the front surface 53 that reflects light from the first light source 61 toward the display window 38 (see FIGS. 10 and 11 which include light arrows L that depict light directed toward the display window 38). The front surface 53 includes a diffuser film 63 that diffuses the light toward the display window 38. The rear surface 54 includes a reflective film 65 that reflects light from the first light source 61 toward the display window 38. The rear surface 54 has reflective properties that increase as the rear surface 54 extends away from the first light source 61 (i.e. the reflective properties of the rear surface 54 can include reflectivity, light absorption, light scattering, and/or the like, the strength of which increases further away from the first light source 61). In certain examples, the light guide 52 defines a cavity (not shown) that receives the light and vertically upwardly guides the light from the lighting source 61. The light guide 52 can be made of any suitable transparent or translucent material such as plastic, glass, and the like.

Figure 6:
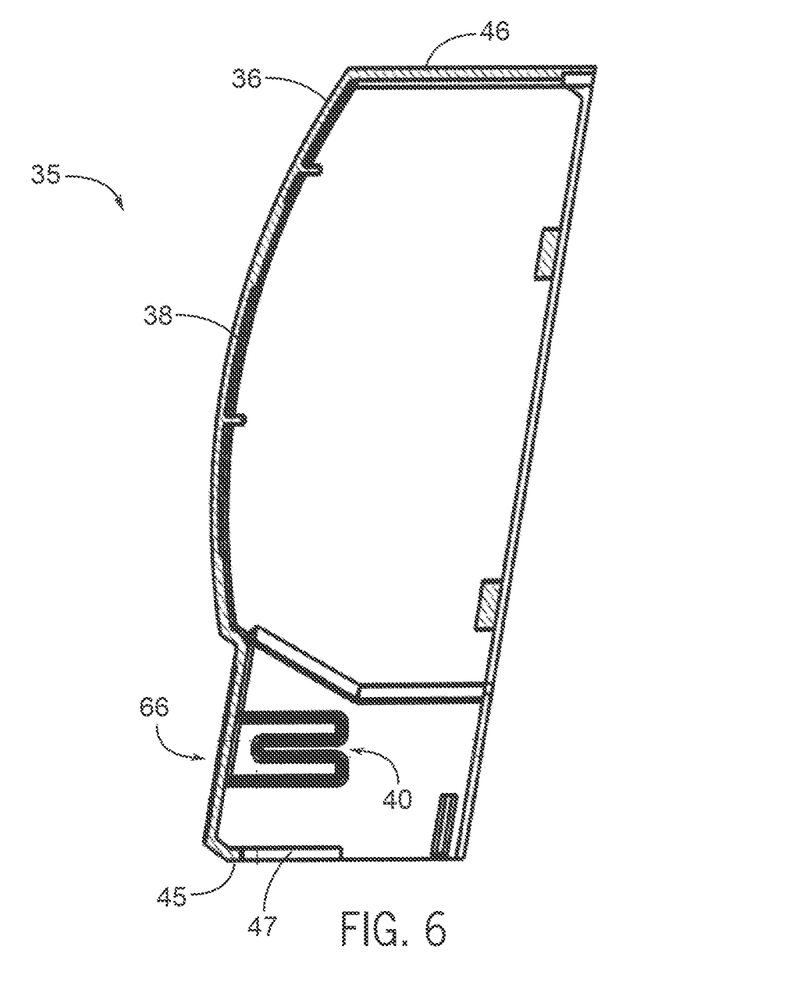
FIG. 6 is a cross section view of the housing of FIG. 5.
Figure 7:
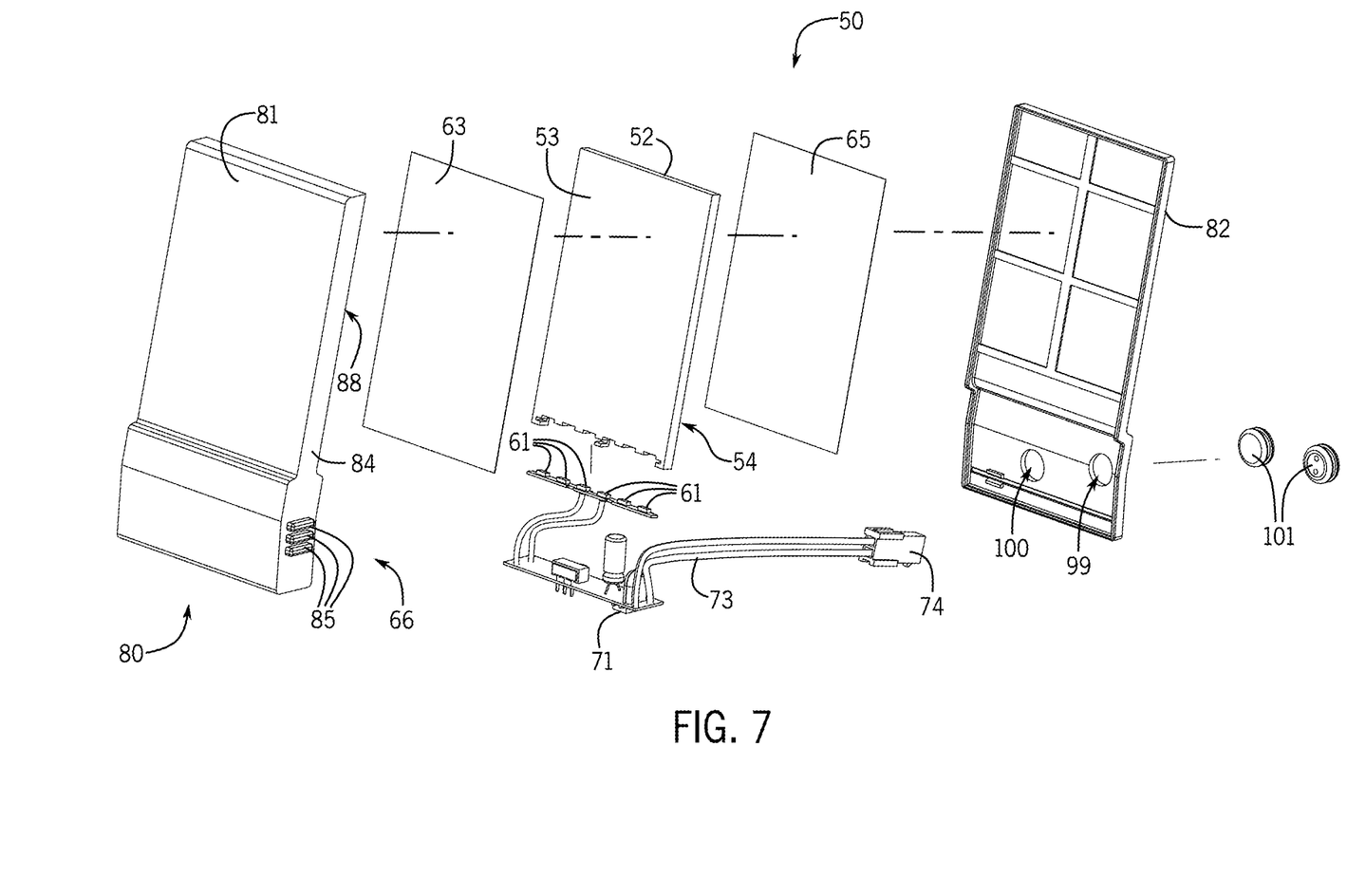
FIG. 7 is an exploded view of an example lighting module.
Figure 8:
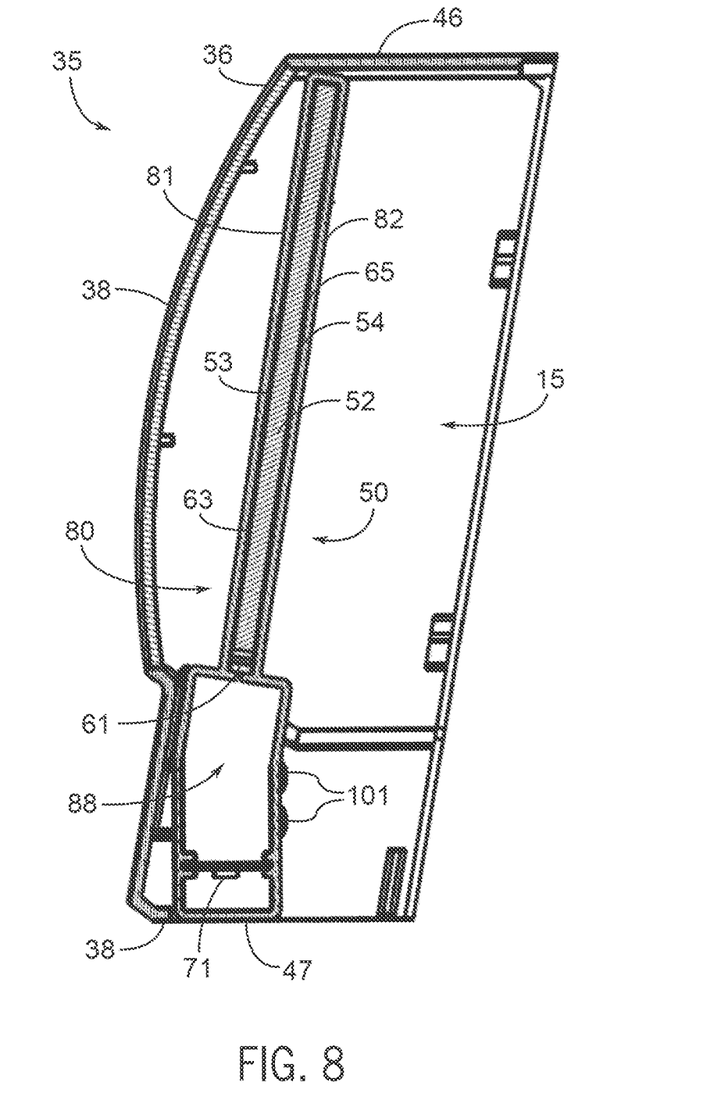
FIG. 8 is a cross section view of the example housing of FIG. 5 and the lighting module of FIG. 7.
Figure 9:
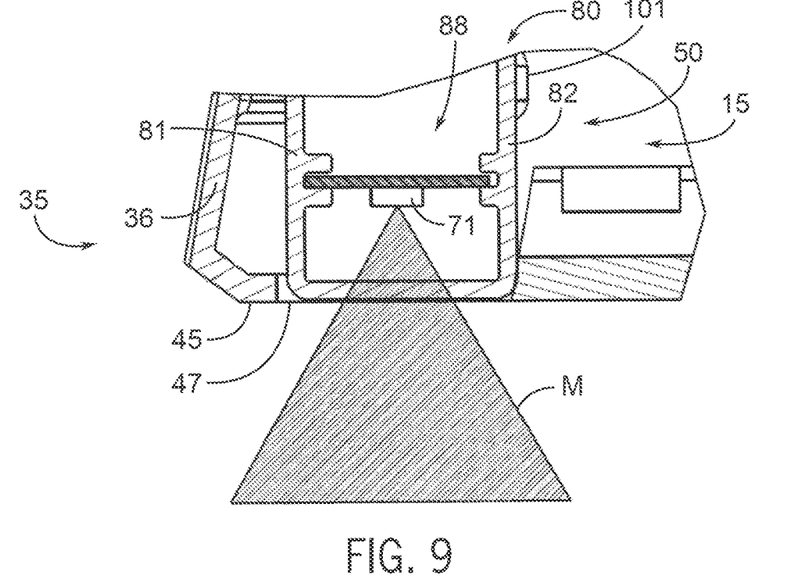
FIG. 9 is an enlarged view along line 9-9 in FIG. 3.
Figure 10:
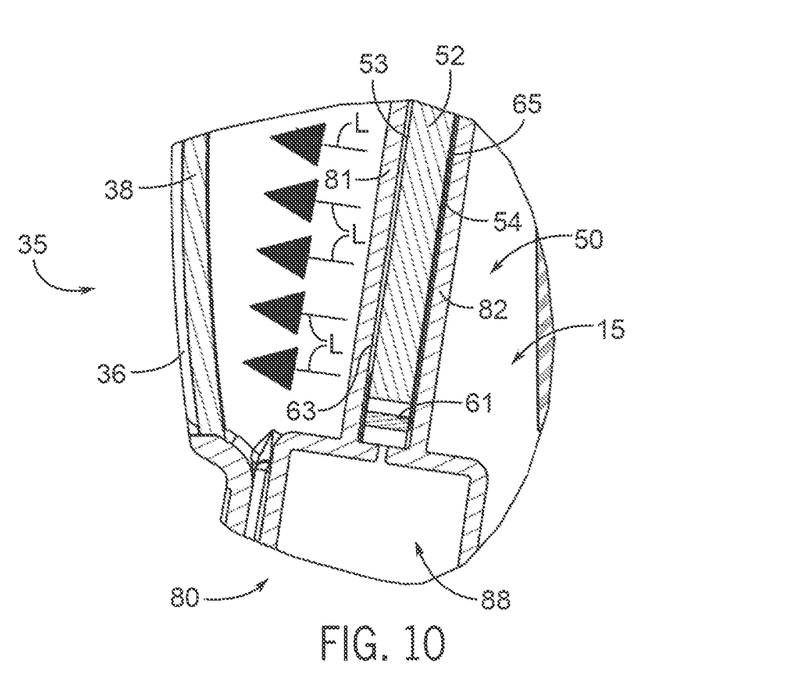
FIG. 10 is an enlarged view along line 10-10 in FIG. 3.
Figure 11:
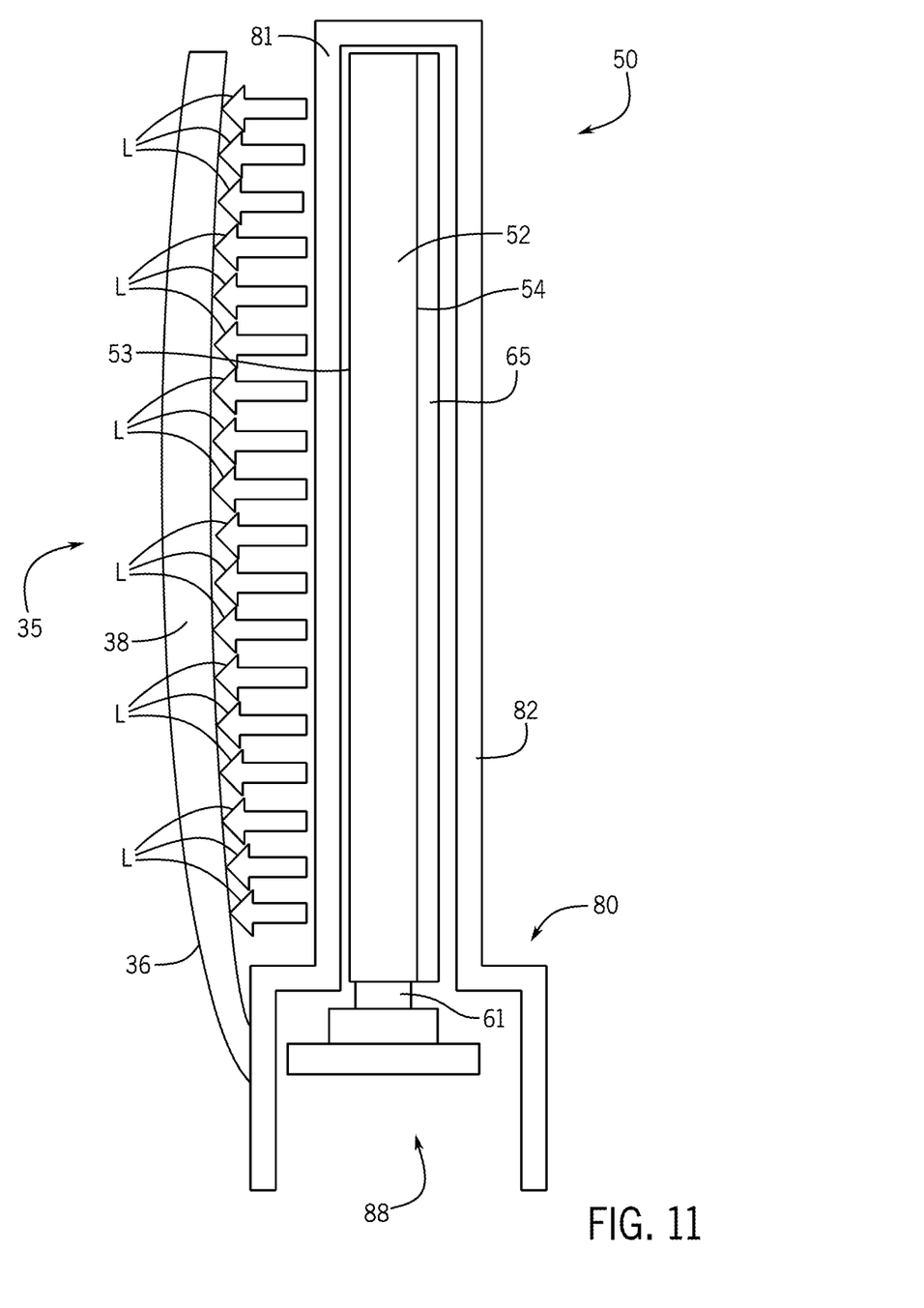
FIG. 11 is a side view of an example lighting module and a front of a housing.

The lighting module 50 is removably coupled to the housing 35 by a manually operable mating connection 66 (FIGS. 6-7). The mating connection 66 includes a boss 85 (FIG. 7) on one of the lighting module 50 and the housing 35 and a channel 40 (FIGS. 5-6) defined in the other of the lighting module 50 and the housing 35. The channel 40 is configured to receive the boss 85. In the example depicted in FIGS. 5-7, the boss 85 is on the lighting module 50 and the channel 40 is defined in the housing 35.

Figure 12:
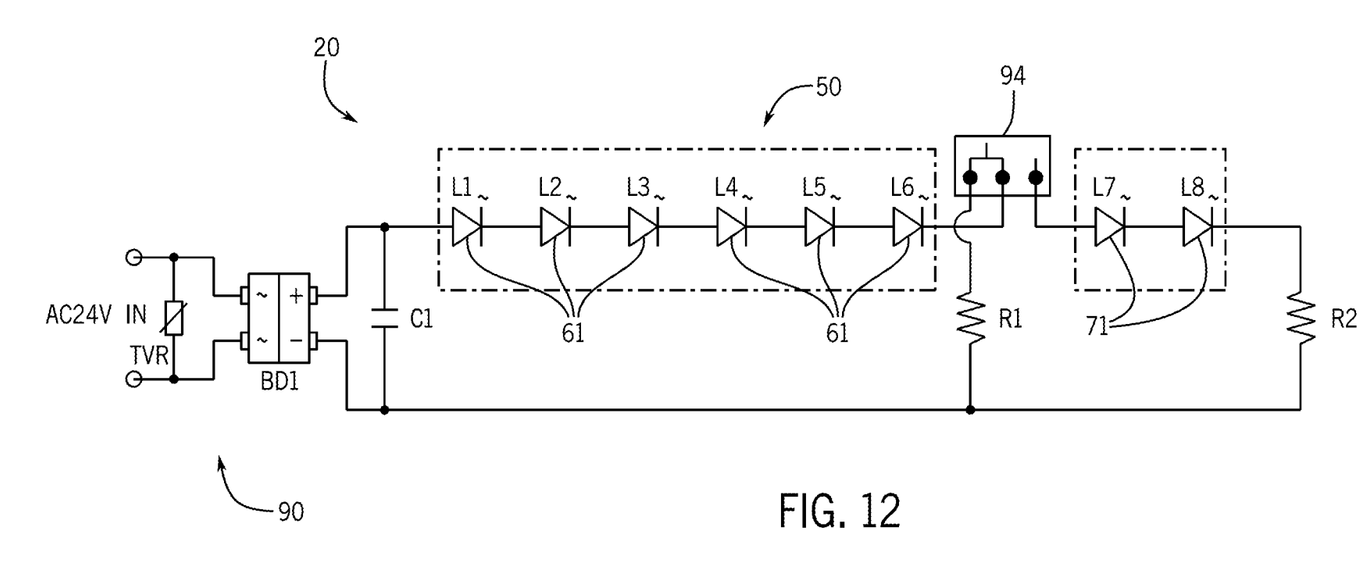
FIG. 12 is an example circuit diagram.
Figure 13:
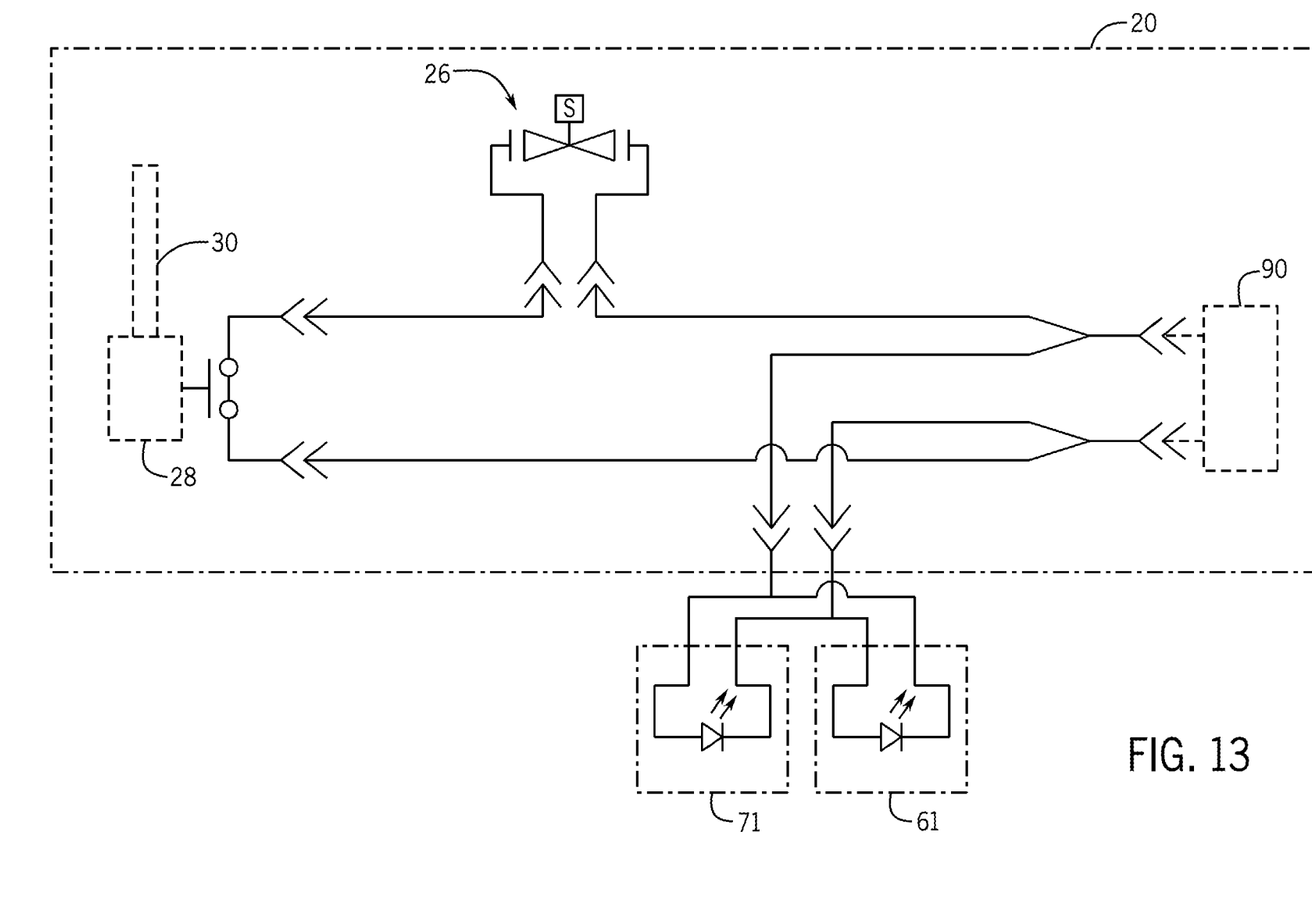
FIG. 13 is an example circuit diagram.

The lighting module 50 is further electrically coupled to the dispensing head 20 by a manually operable electrical connection 73 (FIG. 7). The electrical connection 73 couples to lighting module 50 to the electrical circuit that receives power for a power source 90 (FIGS. 12-13) and that is electrically coupled to the valve 26 (FIGS. 12-13). In the example depicted in FIG. 7, the electrical connection 73 is a wire harness that has a male connection end 74 that is configured to mate with a female connection receiver (not shown) on the dispensing head 20 (FIG. 4).

Referring to FIG. 7, the lighting module 50 includes a casing 80 that defines a cavity 88 that receives the light guide 52, the first light source 61, and/or the second light source 62 to thereby protect and seal the light guide 52, the first light source 61, and/or the second light source 62 from contaminants and moisture. The casing 80 includes a front panel 81 and a rear panel 82 opposite the front panel 81 that hermetically seals with the front panel 81. The front panel 81 includes a pair of opposing sides 84 that extend toward the rear panel 82. The front panel 81 is configured to allow light to travel from the light guide 52 to the display window 38 and/or the lighting opening 47. The panels 81, 82 can include transparent, translucent, and/or opaque sections.

The rear panel 82 defines an opening 99 that allows the electrical connection 73 to be received there through while still maintaining the hermetic seal with the front panel 81. The rear panel 82 also defines an access opening 100 that receives a removable grommet 101. The grommet 101 can be removed to allow inspection and/or maintenance to the components in the casing 80.

In certain examples, the dispensing head 20 incudes a rear lighting module 51 (FIG. 3) configured to illuminate the rear display window 44 of the rear 42. The rear lighting module 51 is similar to the lighting module 50 and can include any of the components described with reference to the lighting module 50. In certain examples, the rear lighting module 51 includes a second manual electrical connection that electrically couples the rear lighting module to the dispensing head 20.

Referring to FIGS. 12-13 example circuit diagrams for the dispensing head 20 and the lighting module 50 are shown. The lighting module 50 is coupled to the power source 90 via the electrical connection 73 (FIG. 7). In certain examples, the power source 90 is a 24 Volt AC power source. In certain examples, a slide switch 94 is included and configured to electrically uncouple to the second light source 71 from the circuit such that the second light source 71 does not emit light.

The lighting module 50 and/or the electrical circuits to which the lighting module 50 is coupled via the electrical connection 73 can include electrical devices and/or components which vary the operation of the lighting module 50 (i.e. various electrical devices may cause the light sources 61, 71 to blink, dim, gradually illuminate, and/or perform other functions).

What is claimed is:

1. A lighting module for a beverage dispensing head with a housing, the light module comprising:
    a first light source configured to emit light in a first direction into a light guide extending in the first direction, a reflective surface positioned relative to the light guide to reflect light from the first light source in a second direction different from the first direction;
    a second light source configured to emit light in a third direction, the third direction different from the second direction and generally opposite the first direction;
    a casing comprising a front panel and a rear panel defining a cavity in which the first light source the light guide, the reflective surface, and the second light source are positioned, wherein the front panel is configured to permit light from the first light source to pass through the front panel in the second direction and configured to permit light from the second light source to pass through the casing in the third direction; and
    a wire harness configured to pass through the casing to electrically couple the first light source and the second lighting source to the beverage dispensing head.

2. The lighting module according to claim 1, further comprising a front cover configured to connect to the housing and configured to retain the casing within the front cover, the front cover comprising a display window adjacent to the front panel of the casing, wherein light in the second direction passes through the display window.

3. The lighting module according to claim 2, further comprising:
    a diffuser positioned relative to the light guide to diffuse light from the first light source through the display window.

4. The lighting module according to claim 3, further comprising a physical mating connection between the casing and the front cover to connect the casing to the front cover.

5. The lighting module according to claim 4, wherein the physical mating connection comprises a boss on the casing and a channel in the front cover, the channel configured to receive the boss.

6. The lighting module according to claim 2, comprising a mating connection configured to retain the casing within the front cover.

7. The lighting module according to claim 6, wherein the mating connection comprises a boss and a channel.

8. The lighting module according to claim 2, wherein the display window is curved to form a lens.

9. The lighting module according to claim 1, wherein the wire harness is further configured to couple to a power source of the beverage dispensing head.

10. The lighting module according to claim 9, further comprising a switch connected to the second light source, wherein the switch is configured to selectively disable operation of the second light source.

11. The lighting module according to claim 1, wherein the reflective surface has a reflective property that increases as the reflective rear surface extends away from the first light source.

12. The lighting module according to claim 1, wherein the reflective surface is a reflective film secured to the light guide.

13. The lighting module according to claim 1, further comprising a diffuser positioned relative to the light guide to diffuse light from the first light source in the second direction.

14. The lighting module according to claim 1, wherein the second light source is configured to emit light in the third direction below the dispensing head.

15. A method of adding a lighting module to a beverage dispensing head, the method comprising:
    providing a lighting module of claim 1;
    connecting the wire harness to a power source of the beverage dispensing head;
    connecting the casing of the lighting module interior of a front cover comprising a display window to position the front panel of the casing adjacent the display window to direct light from the first light source in the second direction through the display window; and securing the front cover to the beverage dispensing head, wherein the second light source is configured to emit light in the third direction at a location below the dispensing head.

16. The method of claim 15, further comprising:
selectively disabling operation of the second light source with activation of a switch connected to the second light source and to the wire harness.

17. A lighting module for a beverage dispensing head with a housing, the light module comprising:
 a front cover configured to connect to the housing, the front cover comprising a display window;
 a casing retained within the front cover and adjacent to the display window, the casing comprising a front panel and a rear panel defining a cavity, wherein the front panel is configured to permit light to pass through the front panel in a first direction towards the display window, and the casing is configured to permit light to pass through the casing in a second direction different from the first direction;
 a first light source secured within the casing, the first light source configured to emit light in a third direction, the third direction different from the second direction and generally opposite the second direction;
 a light guide secured within the casing, and extending away from the first light source in the third direction, the light guide configured to transmit light from the first light source through the light guide in the third direction;
 a reflective surface positioned relative to the light guide to reflect light from the first light source in the first direction;
 a second light source secured within the casing and configured to emit light in the second direction below the front cover.

18. The lighting module of claim 17, further comprising a wire harness configured to pass through the casing and electrically couple the first light source and the second lighting source to the beverage dispensing head.

* * * * *